March 10, 1942.　　S. T. SCHWARTZ　　2,275,595
PULVERIZER
Filed April 22, 1938　　5 Sheets-Sheet 1

Fig. 1

INVENTOR.
Sidney T. Schwartz
BY
ATTORNEY.

March 10, 1942.    S. T. SCHWARTZ    2,275,595
PULVERIZER
Filed April 22, 1938    5 Sheets-Sheet 3

INVENTOR.
Sidney T. Schwartz
BY
ATTORNEY.

March 10, 1942.    S. T. SCHWARTZ    2,275,595
PULVERIZER
Filed April 22, 1938    5 Sheets-Sheet 4

INVENTOR.
Sidney T. Schwartz
BY
ATTORNEY.

March 10, 1942.  S. T. SCHWARTZ  2,275,595
PULVERIZER
Filed April 22, 1938  5 Sheets-Sheet 5

INVENTOR.
Sidney T. Schwartz
BY
ATTORNEY.

Patented Mar. 10, 1942

2,275,595

UNITED STATES PATENT OFFICE 2,275,595

PULVERIZER

Sidney T. Schwartz, Grand Island, N. Y., assignor to The Babcock & Wilcox Company, Newark, N. J., a corporation of New Jersey Application April 22, 1938, Serial No. 203,480

20 Claims. (Cl. 83—45)

The present invention relates to the construction and operation of pulverizers of the type having rolling grinding elements located between cooperating relatively movable grinding rings and particularly to pulverizers of the type described designed for pulverizing coal, cement materials and the like at moderate capacities and in which the pulverized material is removed from the pulverizer in suspension in a gaseous carrier medium.

The general object of my invention is a provision of a pulverizer of the type described which is characterized by its low power consumption per ton of output, high fineness of the output, and relatively low cost of manufacture and maintenance. A further object is the provision of a pulverizer of the type described with an improved construction of an integral classifier and further characterized by the low gaseous pressure drop through the pulverizer and low head room and floor space requirements. A further object is the provision of a pulverizer of the type described with an improved construction and arrangement of the parts defining the flow path of the gaseous carrier medium through the pulverizer.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

The pulverizer illustrated in the drawings comprises a substantially cylindrical sectional housing, consisting of a cast iron base section 1, having a slightly conical bottom 2 grouted into a suitable foundation 3. The upper section 4 of the housing is of welded steel plate construction mounted on and detachably connected to the base section. The housing base section contains the pulverizer drive assembly, which includes a pinion shaft 5, reduction bevel gears 6 and 7 providing a drive connection between the shaft 5 and a vertical drive shaft 8 axially arranged in the housing. The base section also includes the usual thrust and journal bearings preferably of roller type for holding the shafts in the positions illustrated.

The drive shaft 8 extends upwardly into the upper section of the housing, and on its upper end is keyed a drive yoke 10 of generally conical form. The grinding parts of the pulverizer comprise a lower grinding ring 11 resting on and keyed to the lower outer portions of the drive yoke. The grinding ring 11 has a track 12 formed in its upper face for a circular row of rolling grinding elements 13, preferably balls made of wear resistant alloy steel. The balls 13 support an upper grinding ring 14 having a ball track formed in it lower face. The upper grinding ring 14 in turn carries an annular spider 15 secured thereto and formed with an inner inclined surface 16. The spider 15 is provided with angularly spaced lugs 17 positioned in guides on the inner wall of the housing 4 for preventing rotation, but permitting vertical movements, of the spider and upper grinding ring. A resilient grinding pressure is exerted downwardly on the grinding parts by a series of externally adjustable coiled springs 19 engaging the spider 15. With the described arrangement, the thrust of the springs 19 and weight of the grinding parts are imposed on the vertical drive shaft and transmitted thereby to the shaft thrust bearing advantageously located close to the foundation.

Figure 1:
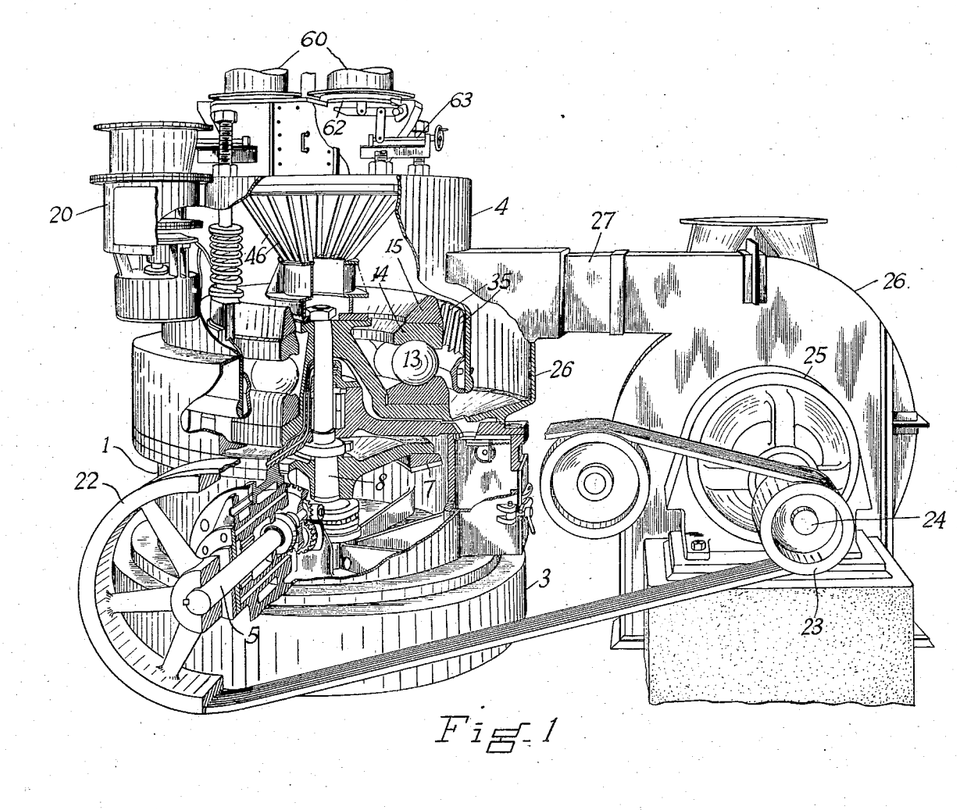
Fig. 1 is a perspective view, partly broken away, of the fan, pulverizer, and feeder, the feeder and fan connection being angularly displaced for purposes of clarity.
Figure 2:
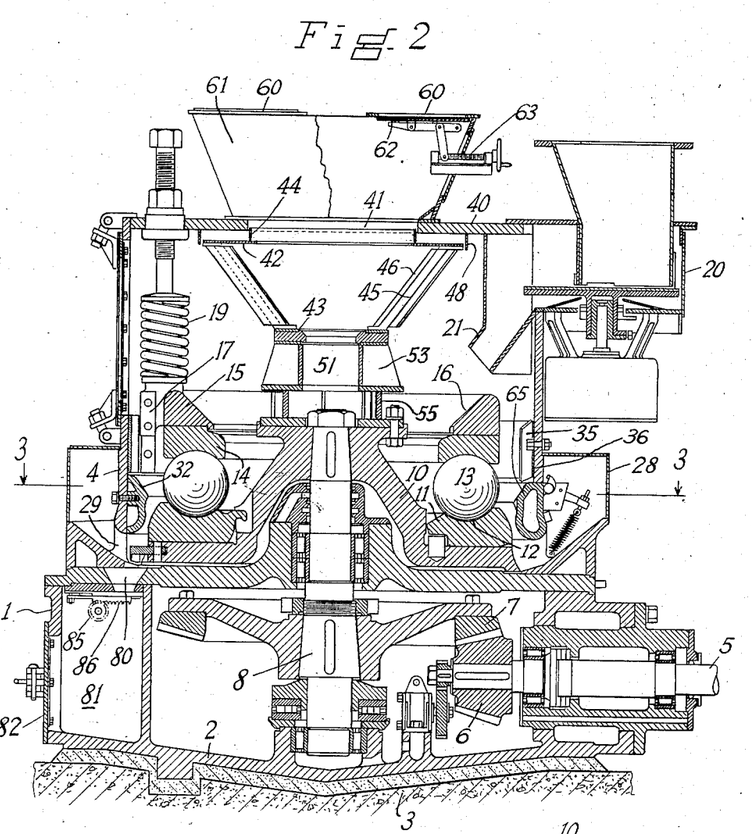
Fig. 2 is a sectional elevation of the pulverizer shown in Fig. 1.

As shown in Figs. 1 and 2, the material to be pulverized is delivered to the pulverizer in regulated quantities by a table feeder 20 having a shrouded feed spout 21 extending downwardly to a point superadjacent the spider 15. In operation the raw material drops from the feed spout 21 onto the spider surface 16 from which it falls over the inner edge of the upper grinding ring 14 onto the upper surface of the drive yoke 10 and lower grinding ring 11, being distributed thereon due to the rotation of these parts. The head of material aided by the centrifugal effect on the material due to the rotating parts causes the material to flow outwardly over the upper surface of the lower ring where it is pulverized between the relatively moving balls and grinding rings.

Figure 3:
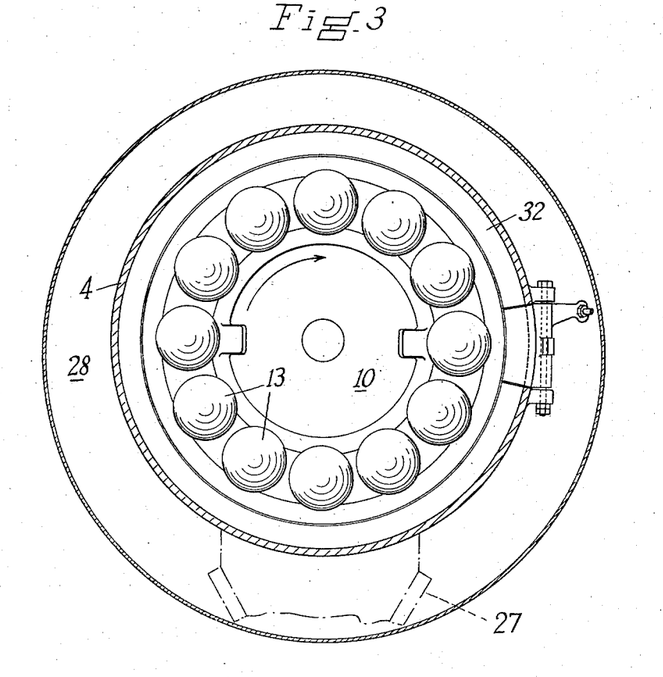
Fig. 3 is a horizontal section taken on the line 3—3 of Fig. 2.
Figure 4:
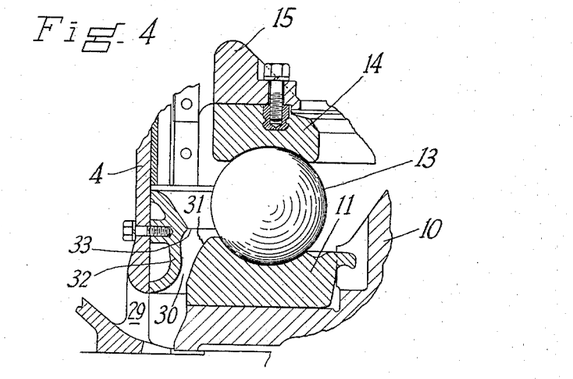
Fig. 4 is an enlarged view of a portion of the grinding zone shown in Fig. 2.
Figure 5:
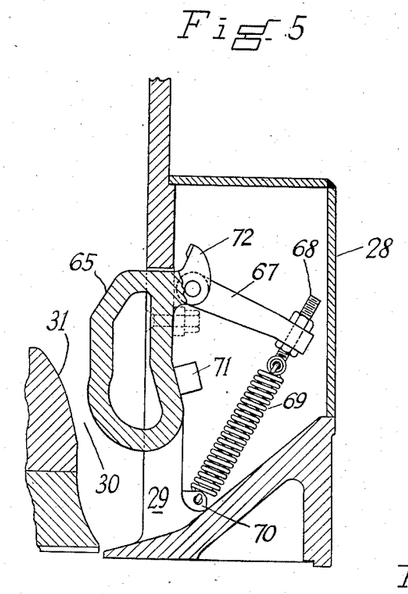
Fig. 5 is an enlarged sectional view of the relief gate assembly.
Figure 6:
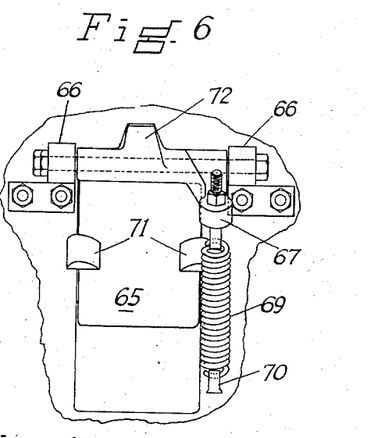
Fig. 6 is a view of the outer side of the relief gate.

As shown in Fig. 1, the pulverizer is driven by a large pulley 22 mounted on the outer end of the pinion shaft 5 and connected by a V-belt drive to a smaller pulley 23 at one end of a shaft 24 of a double extension shaft motor 25. A primary air fan 26 is mounted on the opposite end of the motor shaft and delivers air, preferably preheated, through a conduit 27 leading to an annular wind box 28 surrounding the lower part of and eccentrically arranged relative to the housing section 4, as shown in Fig. 3. The wind box 28 communicates with the interior of the housing section 4 through a series of air ports 29 in the housing opening thereto opposite the circumferential edge of the drive yoke 10, i. e. below the discharge level of the pulverized material.

The air ports 29 are connected to the portion in the housing at the outer side of the balls 13 by a specially formed annular air passage or nozzle 30. The air passage 30 advantageously has a cross-sectional shape substantially similar to that of a Venturi tube inclined upwardly and somewhat inwardly toward the ball row 13. The inner side of the passage 30 is defined by an upwardly tapering circumferential portion 31 of the lower grinding ring convexly curved about a center below and in alignment with the ball centers, while the outer side of the passage is formed by an annular throat plate 32 bolted to the inside of the housing section 4 directly above the air ports 29. The throat plate 32 has the lower portion of its inner face opposite to the curved circumferential portion 31 of the lower grinding ring convexly curved to form an upwardly tapering passage section leading to a relatively narrow throat. The curvature of the throat plate inner face is continued above the throat to approximately a level slightly below the portion of the upper face of the lower grinding ring beyond the balls to provide the upwardly flaring or expanding section of the passage 30. Above the level referred to, the throat ring inner face is concavely curved for a short distance to a level 33 above the top face of the lower grinding ring, then inclined outwardly to the housing wall.

With the described contour of the passage 30 the carrier air entering the ports 29 will have its velocity progressively increased until reaching the throat, at which level the air velocity will be sufficient to prevent any pulverized material within the designed density range from dropping through the throat and clogging the air ports. The air velocity will progressively decrease on leaving the throat and while flowing through the flaring section of the passage 30 but will remain at a sufficient value to sweep up all the pulverized material leaving the ball row. The described contour of the flared section of the throat passage is particularly advantageous for causing the carrier air to be directed to some extent into the space between the grinding rings occupied by the ball row, but preferably without passing through the same. This arrangement has been found in practice to result in a more effective scavenging of fines from the grinding parts and a uniform sweeping of the material discharged from the grinding zone over its whole circumference.

Figures 9, 11, 12, 16, 17:
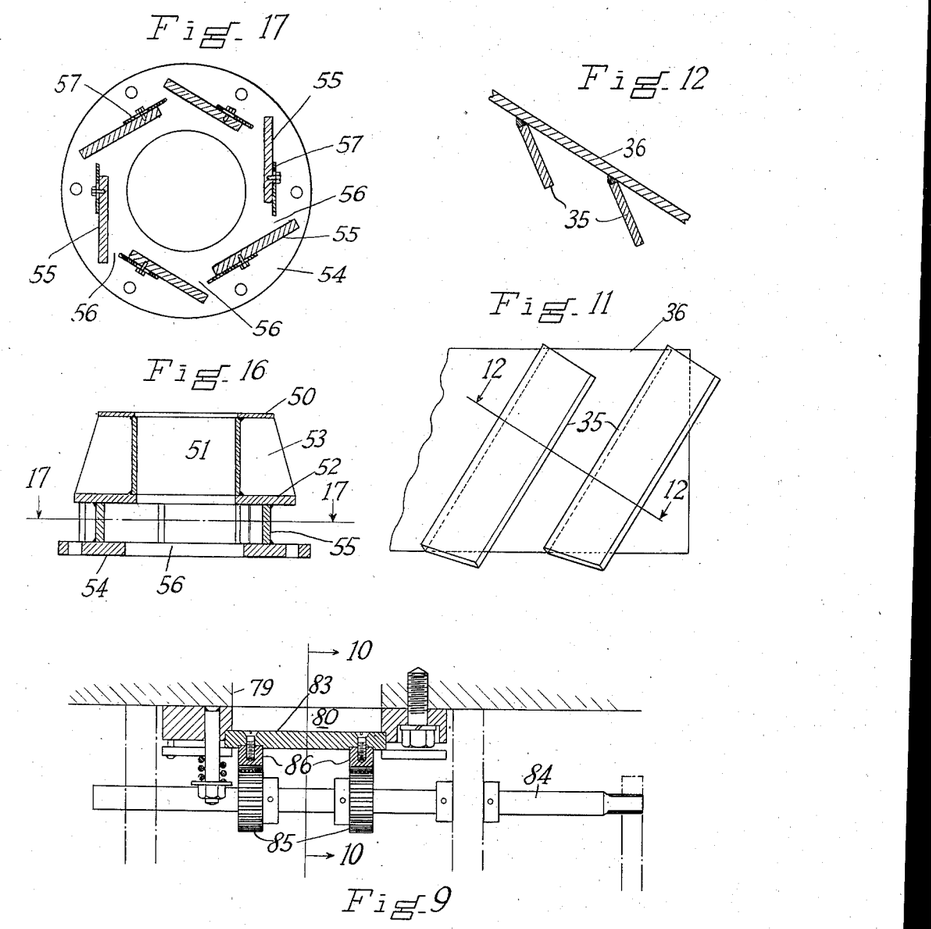
Fig. 9 is a transverse section of the refuse hopper gate assembly.
Fig. 11 is an elevation of a developed portion of the deflector vanes and deflector plate.
Fig. 12 is a section taken on the line 12—12 of Fig. 11.
Fig. 16 is a vertical section of the classifier support.
Fig. 17 is a horizontal section taken on the line 17—17 of Fig. 16.
Figure 10:
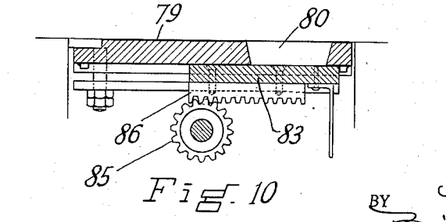
Fig. 10 is a vertical section taken on the line 10—10 of Fig. 9.

The air conduit 27 is radially connected to the wind box 28, causing a division of the entering air into two streams to the circular series of air ports 29. It has been found that the rotating grinding parts tend to effect some rotation of the air stream while it is passing upwardly through the throat passage 30. If such swirling of the air were permitted to continue after sweeping up the pulverized material a premature centrifugal separation of the material particles would tend to occur and consequently a needless return of fines to the grinding zone. Such swirling would also tend to obstruct the outward flow of pulverized material from the grinding zone and thereby reduce the pulverizer capacity while increasing the power consumption. As shown in Figs. 11 and 12, a circular series of deflector vanes 35, formed by vertically elongated rectangular steel plates welded to the inner side of curved plate sections 36 bolted on the inner side of the housing section 4, are arranged so as to dampen the rotation of the material-laden air. The plates 35 extend at an angle of approximately 37° from the housing wall, and are obliquely arranged thereon with their upper edges leading in the direction of ring rotation. The deflector vanes extend upwardly along the housing from a level superadjacent the throat plate 32 to a level above the upper grinding ring 14.

The top of the housing section 4 is closed by a circular plate 40 having a central circular discharge opening 41 for material-laden air. The material-laden air flows upwardly along the side walls of the housing section 4, during which travel some of the oversize particles separate from the air stream and drop back into the grinding zone. Before reaching the outlet 41 the material-laden air is subjected to the action of a rotary classifier symmetrically arranged relative to the outlet 41.

Figures 13, 14, 15:
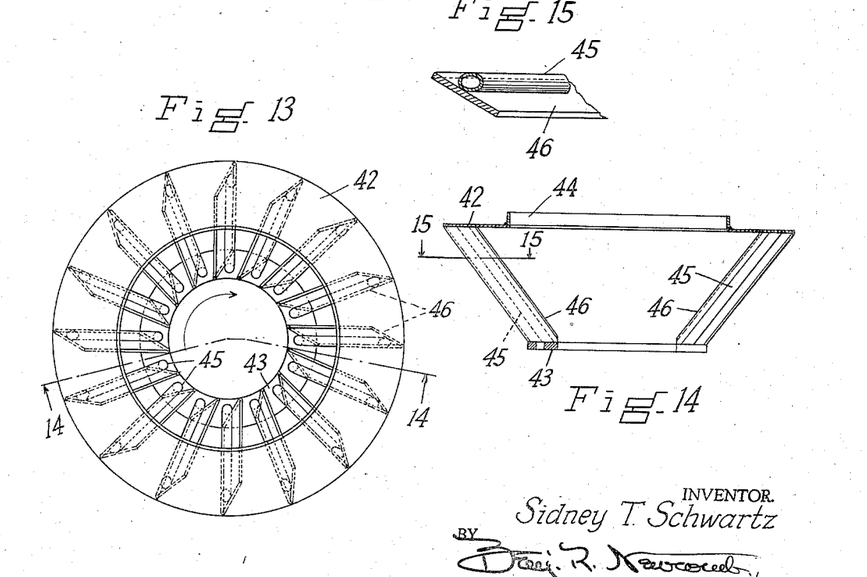
Fig. 13 is a plan view of the rotary classifier.
Fig. 14 is a vertical section taken on the line 14—14 of Fig. 13.
Fig. 15 is a horizontal section taken on the line 15—15 of Fig. 14.

As shown in Figs. 13–17, the rotary classifier is formed by upper and lower horizontally arranged annular plates 42 and 43 respectively. The plate 42 extends beyond the circumference of the plate 43 and at its inner side has an uprising circular flange 44 which fits into the outlet opening 41. A circular series of vertical rods or pipes 45 is symmetrically arranged in an inverted frustoconical formation between the plates 42 and 43 and welded thereto. Each of the rods 45 carries a blade 46 welded thereto, as shown in Fig. 15, and extending between the plates 42 and 43. The blades 46 are obliquely arranged with respect to the plates 42 and 43 with their outer edges leading in the direction of rotation of the classifier indicated by the arrows in Figs. 3 and 13. With this arrangement the outer portion of each blade and corresponding rod forms a pocket extending throughout the height of the classifier and in which oversize material tends to collect and flow downwardly to the plate 43 without again entering the air stream passing through the classifier. A circular outer flange 48 depends from the top wall 40 along the outer edge of the plate 42 to seal the passage between the classifier and top wall. An integral rotary classifier of this type permits the use of a substantially smaller top housing section than would be required for pure gravity separation of the oversize material. The classifier construction described has been found so effective that substantially none of the finished material is returned to the grinding zone, while all oversize particles are recirculated. Approximately 99% of the material passing through the classifier and out of the pulverizer will pass through a 50-mesh screen. The classifier construction described also allows the use of an air velocity sufficient for the air to pick up all of the pulverized material emerging from the grinding zone and to carry it upward to the classifier without any danger of oversize material passing through the classifier.

The classifier is detachably mounted on and its rotation effected by a supporting structure, as shown in Figs. 2, 16 and 17, carried by the pulverizer drive mechanism. The classifier lower plate 43 is bolted to a circumferential flange 50 on the upper end of a cylindrical support member 51, through which the separated oversize material drops. A second circumferential flange 52 is welded on the lower end of the member 51, which is further strengthened by radial ribs 53 extending between the flanges. The driving yoke 10 is enlarged circumferentially at its upper end and bolted to an annular plate 54 below the flange 52. The oversize material dropping through the support member 51 lands on the plate 54 and upper end of the drive shaft. A series of horizontally elongated rectangular plates 55 are welded to the flange 52 and plate 54 and arranged as shown in Fig. 17. The plates 55 are spaced to provide vertically elongated outlets 56 therebetween for the passage of oversize material. The width of the discharge passages 56 is adjustably regulated by plates 57 slidably mounted on the outer side of the plates 55. The oversize material passes over the outer edge of the plate 54 to the inner side of the ball row. A pair of outlets 60 for material-laden air are formed in an inverted frusto-conical extension 61 of the housing outlet 41. Each of the outlets 60 is controlled with a swing type valve comprising a valve disc 62 and screw mechanism 63 for moving the disc 62 between its open and closed positions.

The throat plate 32 is cut away at one segmental section to permit the installation of a spring-pressed relief gate 65 for disposing of large pieces of unpulverizable foreign material, such as tramp iron. The relief gate has an inner surface substantially corresponding in contour to that of the throat plate, and is pivotally mounted in brackets 66 mounted on the adjacent portions of the houing section 4. The gate carries an arm 67 extending into the wind box 28 and in the outer end of which a spring eye-bolt 68 is adjustably mounted. A coiled spring 69 connects the lower end of the eye-bolt 68 and an anchor lug 70 on the housing. A pair of stops 71 projects beyond opposite ends of the relief gate to abut adjacent portions of the housing 4 and limit the movement of the gate under the spring action. A central upper stop 72 is mounted on the upper portion of the gate, and by contacting with the housing section 4 limits the outward pivotal movement of the relief gate. With this arrangement tramp iron entering the pulverizer with the raw material and passing through the ball row will be moved along the throat plate by the rotating grinding ring until the relief gate is reached. The relief gate swings outwardly under the pressure exerted thereon to permit the tramp iron to drop below the throat plate, from which region it can be readily removed through access doors in the wind box.

Figure 7:
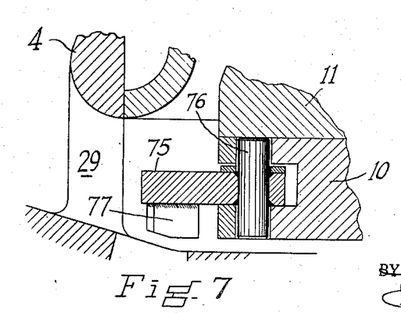
Fig. 7 is an enlarged view of one of the lower grinding ring sweeps.
Figure 8:
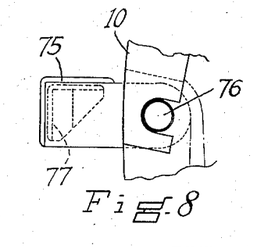
Fig. 8 is a plan view of the plow shown in Fig. 7.

Special provisions are also provided for disposing of relatively unpulverizable small size material, such as pyrites particles. Such particles are of sufficient size and density to drop through the throat against the rising air stream and into the subadjacent portion of the pulverizer. As shown in Figs. 2, 7, and 8, a pair of sweeps or plows 75 are mounted in recesses in the circumferential face of the drive yoke 10 and held in position by pins 76. The sweeps have angular extensions 77 which sweep over the bottom plate of the housing section 4 adjacent the air ports 29. At a point shown as diametrically opposite the relief gate, the bottom plate 79 of the housing section 4 is provided with a rectangular opening 80 through which the pyrites particles can drop into a subadjacent compartment or hopper 81 in the housing base section. A clean-out door 82 permits access to the compartment 81 for the removal of the collected material. The opening 80 is normally open except when it is desired to remove accumulated material from the compartment 81. For that purpose a horizontally slidable gate 83 is mounted in guides below the opening 80 and manually actuated through a shaft 84, pinion gears 85 and racks 86 to open and close the opening 80.

The pulverizer construction described is characterized by the quiet and smooth operation resulting from its rugged construction, base drive using a short vertical drive shaft, relative isolation of the grinding elements from the pulverizer housing, and a relatively low ball speed. It is particularly characterised by its lower power consumption per ton of capacity. For example, typical power requirements for this pulverizer unit, including the feeder and fan power, range from 7 to 10.5 k. w. h. per ton for pulverizing coals of 50–100 grindability to a fineness of 70–90% through a 200 mesh screen for an output of 2–10 tons per hour. A high fineness of the pulverized material is secured at maximum loads and increases at low and intermediate loads. The use of wear resistant alloy steel heat treated grinding balls and the low speed of rotation at which the balls are driven increase the life of the grinding parts and reduce maintenance costs. A constant fineness and capacity is maintained throughout the life of the grinding elements. The increased capacity per unit of ring diameter reduces the floor space requirements and the cost of the equipment.

While in accordance with the provisions of the statutes I have illustrated and described herein the best form of my invention known to me, those skilled in the art will understand that changes may be made in the form of the apparatus and character of the carrier medium disclosed without departing from the spirit of the invention covered by the claims, and that certain features of the invention may sometimes be used without a corresponding use of other features. In the claims, the word "air" is intended to generically cover any gaseous carrier medium suitable for removing pulverized material in the manner described.

I claim:

1. A pulverizer comprising a casing enclosing a lower grinding ring, a circular row of rolling grinding elements, supported on said lower grinding ring, an upper grinding ring supported on said grinding elements, said lower grinding ring having a vertical discharge edge at a level below the centers of said grinding elements, means for effecting relative angular movement of said grinding rings, means for delivering material to be pulverized to the inner side of said row of grinding elements, and means for directing a stream of air upwardly past and in contact with the outer side of said lower grinding ring to sweep up pulverized material discharging therefrom including means cooperating with the outer periphery of said lower grinding ring to define therebetween an air passage having a restricted throat below the level of the discharge edge of said lower grinding ring, and circumferentially arranged upwardly and inwardly directed baffle means for deflecting the air stream leaving said throat into the space between said grinding rings.

2. A pulverizer comprising a casing enclosing a lower rotary grinding ring, a circular row of rolling grinding elements supported on said lower grinding ring, a non-rotary upper grinding ring supported on said grinding elements, said lower grinding ring having a material discharge edge at a level below the centers of said grinding elements, means for rotating said lower grinding ring, means for delivering material to be pulverized to the inner side of said row of grinding elements, and means for directing an annular stream of air upwardly past and in contact with the outer side of said lower grinding ring to sweep up pulverized material discharging therefrom including means cooperating with the outer periphery of said lower grinding ring to define therebetween an annular air passage having a restricted throat below the level of the discharge edge of said lower grinding ring, circumferentially arranged upwardly and inwardly directed baffle means for deflecting the air stream leaving said throat into the space between said grinding rings, and means forming an inclined material-receiving surface at the outer side of and above said lower grinding ring and in position to direct material deposited thereon into the path of the deflected air stream.

3. A pulverizer comprising a casing enclosing a vertical drive shaft, a lower rotary grinding ring operatively connected to said drive shaft, a circular row of rolling grinding elements supported on said lower grinding ring, a non-rotary upper grinding ring supported on said grinding elements, means for delivering material to be pulverized to the inner side of said row of grinding elements, and means for directing an annular stream of air upwardly past and in contact with the outer side of said grinding rings and row of grinding elements to sweep up pulverized material discharging therefrom, said air flow directing means including an annular throat plate having its inner face shaped relative to and cooperating with the outer periphery of said lower grinding ring to define therebetween an annular air passage having a restricted throat below the discharge edge of said lower grinding ring, said throat plate having a lower inner face portion shaped to deflect the air stream into the path between said grinding rings, and an upper inner face portion forming an inclined material-receiving surface at the outer side of and above said lower grinding ring and in position to direct material depositing thereon into the path of the deflected air stream.

4. A pulverizer comprising a casing enclosing a lower grinding ring, a circular row of rolling grinding elements supported on said lower grinding ring, an upper grinding ring supported on said grinding elements, means for effecting relative angular movement of said grinding rings, means for delivering material to be pulverized to the inner side of said row of grinding elements, and means for directing an annular stream of air upwardly past and in contact with the outer side of said lower grinding ring to sweep up pulverized material discharging therefrom including means cooperating with the outer periphery of said lower grinding ring to define therebetween an annular air passage of Venturi-shaped cross-section and means for deflecting the air stream leaving said passage into the space between said grinding rings.

5. A pulverizer comprising a casing enclosing a vertical drive shaft, a lower rotary grinding ring operatively connected to said drive shaft, a circular row of rolling grinding elements supported on said lower grinding ring, a non-rotary upper grinding ring supported on said grinding elements, means for delivering material to be pulverized to the inner side of said row of grinding elements, and means for directing an annular stream of air upwardly past and in contact with the outer side of said grinding rings and row of grinding elements to sweep up pulverized material discharging therefrom, said air flow directing means including an annular throat plate having its inner face shaped relative to and cooperating with the outer periphery of said lower grinding ring to define therebetween an annular air passage of Venturi-shaped cross-section, said throat plate being shaped so as to deflect the air stream into the space between said grinding rings.

6. A pulverizer comprising a casing enclosing a vertical drive shaft, a lower rotary grinding ring operatively connected to said drive shaft, a circular row of rolling grinding elements supported on said lower grinding ring, a non-rotary upper grinding ring supported on said grinding elements, means for delivering material to be pulverized to the inner side of said row of grinding elements, an annular air chamber extending below said lower grinding ring, and means for directing an annular stream of air upwardly past and in contact with the outer side of said grinding rings and row of grinding elements to sweep up pulverized material discharging therefrom, said air flow directing means including an annular throat plate having its inner face shaped relative to and cooperating with a convexly curved portion of the outer periphery of said lower grinding ring to define therebetween an annular air passage of Venturi-shaped cross section inclined inwardly towards said grinding elements in a direction intersecting said grinding element.

7. A pulverizer comprising a casing enclosing a lower grinding ring, a circular row of rolling grinding elements supported on said lower grinding ring, an upper grinding ring supported on said grinding elements, means for effecting relative angular movement of said grinding rings, means for delivering material to be pulverized to the inner side of said row of grinding elements, means for directing an annular stream of air upwardly past the outer side of said lower grinding ring to sweep up pulverized material discharging therefrom including means cooperating with the outer periphery of said lower grinding ring to define therebetween an annular air passage having a restricted throat below the discharge edge of said lower grinding ring, and a movably mounted relief gate arranged to be displaced by and permit the descent of large sized pieces of material through said throat.

8. A pulverizer comprising a casing enclosing a vertical drive shaft, a lower rotary grinding ring operatively connected to said drive shaft, a circular row of rolling grinding elements supported on said lower ring, an upper grinding ring supported on said grinding elements, means for delivering material to be pulverized to the inner side of said row of grinding elements, means for directing an annular stream of air upwardly past the outer side of said lower grinding ring to sweep up pulverized material discharging therefrom, said air flow directing means including an annular throat plate having its inner face shaped relative to the outer periphery of said lower ring to define therebetween an annular passage having a restricted throat, and said throat plate having a segmental pivoted section forming a relief gate for the downward passage of large-sized pieces of material through said throat.

9. A pulverizer comprising a casing enclosing a vertical drive shaft, a lower rotary grinding ring operatively connected to said drive shaft, a circular row of rolling grinding elements supported on said lower ring, an upper grinding ring supported on said grinding elements, means for delivering material to be pulverized to the inner side of said row of grinding elements, means for directing an annular stream of air upwardly past the outer side of said lower grinding ring to sweep up pulverized material discharging therefrom, said air flow directing means including an annular throat plate having its inner face shaped relative to the outer periphery of said lower ring to define therebetween a Venturi-shaped passage, and said throat plate having a counterbalanced segmental pivoted section forming a relief gate for the downward passage of large-sized pieces of material through said passage.

10. A pulverizer comprising a casing enclosing a vertical drive shaft, a lower rotary grinding ring operatively connected to said drive shaft, a circular row of rolling grinding elements supported on said lower ring, a non-rotary upper grinding ring supported on said grinding elements, means for delivering material to be pulverized to the inner side of said row of grinding elements, means for directing an annular stream of air upwardly past the outer side of said row of grinding elements and lower grinding ring to sweep up pulverized material discharging therefrom, said air flow directing means including an annular throat plate having its inner face shaped relative to the outer periphery of said lower ring to define therebetween a Venturi-shaped passage, said throat plate having a counterbalanced segmental pivoted section forming a relief gate for the downward passage of large-sized pieces of material through said passage, and stops arranged to limit the pivotal movements of said segmental throat plate section.

11. A pulverizer comprising a casing having an outlet for material-laden air at its upper end and enclosing a vertical drive shaft, a lower rotary grinding ring operatively connected to said drive shaft, a circular row of rolling grinding elements supported on said lower grinding ring, a non-rotary upper grinding ring supported on said grinding elements, means for delivering material to be pulverized to the inner side of said row of grinding elements, means for directing an annular stream of air upwardly past the outer side of said grinding rings and row of grinding elements to sweep up pulverized material discharging therefrom, and a rotary classifier in said casing mounted on the upper end of said drive shaft, said classifier having upper and lower annular plates, a circular series of supports extending between said plates, and obliquely arranged impact plates extending along the trailing side of said supports.

12. A pulverizer comprising a casing having an outlet for material-laden air at its upper end and enclosing a vertical drive shaft, a lower rotary grinding ring operatively connected to said drive shaft, a circular row of rolling grinding elements supported on said lower grinding ring, a non-rotary upper grinding ring supported on said grinding elements, means for delivering material to be pulverized to the inner side of said row of grinding elements, means for directing an annular stream of air upwardly past the outer side of said grinding rings and row of grinding elements to sweep up pulverized material discharging therefrom, a rotary classifier in said casing above the upper end of said drive shaft, said classifier having upper and lower annular plates, a circular series of supports extending between said plates, impact plates extending along the trailing side of said supports, and a classifier supporting structure mounted on the upper end of said drive shaft and forming a passage for the downward flow of oversize material separated in said classifier and its return to the inner side of said row of grinding elements.

13. A pulverizer comprising a casing having an outlet for material-laden air at its upper end and enclosing a vertical drive shaft, a lower rotary grinding ring operatively connected to said drive shaft, a circular row of rolling grinding elements supported on said lower grinding ring, a non-rotary upper grinding ring supported on said grinding elements, means for delivering material to be pulverized to the inner side of said row of grinding elements, means for directing an annular stream of air upwardly past the outer side of said grinding rings and row of grinding elements to sweep up pulverized material discharging therefrom, a rotary classifier in said casing above the upper end of said drive shaft, said classifier having upper and lower annular plates, a circular series of supports extending between said plates, impact plates extending along the trailing side of said supports, a classifier supporting structure mounted on the upper end of said drive shaft and forming a passage for the downward flow of oversize material separated in said classifier, plates arranged to form material outlets from said passage to the inner side of said row of grinding elements, and means for controlling the effective size of said outlets.

14. A pulverizer comprising a casing enclosing a rotary grinding ring, rolling grinding elements supported on said grinding ring, means for effecting rotation of said grinding ring, means for delivering material to be pulverized to the inner side of said grinding elements, means for directing a stream of air upwardly past the outer side of said grinding ring to sweep up pulverized material discharging therefrom including an annular throat plate cooperating with the outer periphery of said grinding ring to define therebetween an annular air passage having a restricted throat, said throat plate having a pivoted section forming a swinging relief gate for the disposal of material.

15. A pulverizer comprising a casing enclosing a rotary grinding member, rolling grinding elements on said grinding member, means for effecting rotation of said grinding member, means for delivering material to be pulverized to the inner side of said grinding elements, means for directing an annular stream of air upwardly past the outer side of said grinding member to sweep up pulverized material discharging therefrom including an annular throat cooperating with the outer periphery of said grinding member to define therebetween an annular air passage having a restricted throat below the discharge edge of said grinding member, said throat plate having a movably mounted segmental section forming a relief gate for the passage of material depositing in said passage.

16. A pulverizer comprising a casing having an outlet for material-laden air at its upper end and enclosing a vertical drive shaft, a lower rotary grinding ring operatively connected to said drive shaft, a circular row of rolling grinding elements supported on said lower grinding ring, a non-rotary upper grinding ring supported on said grinding elements, means for delivering material to be pulverized to the inner side of said row of grinding elements, means for directing an annular stream of air upwardly past the outer side of said grinding rings and row of grinding elements to sweep up pulverized material discharging therefrom, a rotary classifier in said casing mounted on the upper end of said drive shaft, said classifier having upper and lower annular plates, and a circular series of circumferentially spaced impact members extending between said annular plates and constructed to form pockets on the leading side of said impact members.

17. A pulverizer comprising a casing having an outlet for material-laden air at its upper end and enclosing a vertical drive shaft, a lower rotary grinding ring operatively connected to said drive shaft, a circular row of rolling grinding elements supported on said lower grinding ring, a non-rotary upper grinding ring supported on said grinding elements, means for delivering material to be pulverized to the inner side of said row of grinding elements, means for directing an annular stream of air upwardly past the outer side of said grinding rings and row of grinding elements to sweep up pulverized material discharging therefrom, a rotary classifier in said casing above the upper end of said drive shaft, said classifier having upper and lower annular plates, a circular series of circumferentially spaced obliquely arranged impact members extending between said annular plates and constructed to form pockets on the leading side of said impact members, and a classifier supporting structure mounted on the upper end of said drive shaft and forming a passage for the downward flow of oversize material separated in said classifier and its return to the inner side of said row of grinding elements.

18. A mill comprising a closed casing, a grinding member mounted within the casing for rotation about a central vertical axis, a plurality of rolling grinding elements in contact with said grinding member, means for introducing material to be ground between said grinding member and grinding elements, there being an annular air passage between said grinding member and the enclosing wall of said casing, means for forcing air through this passage to carry away pulverized material in suspension, and choke means mounted in the air passage for restricting the effective width of the passage, said choke means comprising a horizontally arranged movable segmental section yieldable outwardly to permit the effective width of the air passage to be temporarily increased for the passage of material downwardly between said grinding member and movable section.

19. A mill comprising a closed casing, a grinding member mounted within the casing for rotation about a central vertical axis, a plurality of rolling grinding elements in contact with said grinding member, means for introducing material to be ground between said grinding member and grinding elements, there being an annular air passage between said grinding member and the enclosing wall of said casing, means for forcing air through this passage to carry away pulverized material in suspension, means for collecting and withdrawing from the lower portion of the casing heavy waste material falling down through the air passage, a substantially annular choke means mounted in the air passage for restricting the effective rea of the passage, said choke means comprising a movable section pivotally supported adjacent its upper end on the casing wall and yieldable to permit the effective area of the air passage to be temporarily increased for the passage of material downwardly between said grinding member and movable section.

20. A mill comprising a closed casing, a grinding member mounted within the casing for rotation about a central vertical axis, a plurality of rolling grinding elements in contact with said grinding member, means for introducing material to be ground between said grinding member and grinding elements, there being an annular air passage between said grinding member and the enclosing wall of said casing, means for forcing air through this passage to carry away pulverized material in suspension, a substantially annular choke means mounted in the air passage for restricting the effective area of the passage, said choke means comprising a movable section pivotally supported adjacent its upper end on the casing walls, and spring means for yieldingly holding the lower portion of the movable section toward the grinding member to provide a restricted air passage between the grinding member and section, which passage may be temporarily widened to permit the downward passage of waste material by pressing out the section against the spring means.

SIDNEY T. SCHWARTZ.